United States Patent [19]
Ohtomo et al.

[11] Patent Number: 6,104,479
[45] Date of Patent: Aug. 15, 2000

[54] LASER SYSTEM

[75] Inventors: Fumio Ohtomo; Kunihiro Hayashi, both of Tokyo, Japan

[73] Assignee: Kabushiki Kaisha Topcon, Tokyo, Japan

[21] Appl. No.: 09/313,915

[22] Filed: May 18, 1999

[30] Foreign Application Priority Data

May 19, 1998 [JP] Japan .................................. 10-155325

[51] Int. Cl.⁷ ................................ G01C 1/06; G01C 1/18
[52] U.S. Cl. ............................................ 356/143; 356/148
[58] Field of Search ...................................... 356/143, 148, 356/142, 140, 139.1, 141.1, 139.07, 249, 250, 152, 248; 33/281, 282, 285, 286, 290, 291, 292

[56] References Cited

U.S. PATENT DOCUMENTS

| | | | |
|---|---|---|---|
| 4,895,440 | 1/1990 | Cain et al. ................................. | 356/5 |
| 5,784,155 | 7/1998 | Ohtomo et al. ....................... | 356/141.1 |
| 5,867,263 | 2/1999 | Ohtomo et al. ........................... | 356/247 |

*Primary Examiner*—Frank G. Font
*Assistant Examiner*—Michael P. Stafira
*Attorney, Agent, or Firm*—Baker Botts L.L.P.

[57] ABSTRACT

The present invention relates to a laser surveying apparatus capable of forming a measuring reference line and a reference plane by laser light. In the laser surveying apparatus, a mount unit is rotated about a vertical axis, a laser projection unit is rotated about a horizontal axis, a light source applies laser light in a direction parallel to the horizontal axis, a rotating irradiator turnably applies the laser light onto the reference plane, first deflecting means provided in the laser projection unit deflects the laser light in an intersecting direction, and second deflecting means provided in the rotating irradiator deflects the laser light sent from the first deflecting means in an intersecting direction. The first deflecting means comprises a mirror and an image rotator is placed between the mirror and the light source.

20 Claims, 11 Drawing Sheets

LASER SYSTEM

BACKGROUND OF THE INVENTION

The present invention relates to a laser surveying apparatus capable of forming a measuring reference line and a reference plane by laser light, and particularly to a laser surveying apparatus capable of forming a reference line and a reference plane each inclined a predetermined angle toward a horizontal plane as well as a horizontal reference line and a reference plane.

As conventional inclinable rotating laser systems, there are known one having a structure wherein a laser projection unit is supported by gimbals or a spherical surface, and one having a structure in which a laser projection unit is supported on vertical and horizontal axes.

A description will now be made of one having the structure in which the laser projection unit is supported by the spherical surface, based on FIG. 11. A laser projection unit 9100 is supported by a spherical surface and is constructed so that laser light is turnably applied onto a reference plane from a rotating irradiator 9200 provided in the laser projection unit 9100. Incidentally, the rotating irradiator 9200 is driven by a motor 9250.

The laser projection unit 9100 is constructed so as to be inclinable in one direction or two directions by moving an arm 9300 extending in intersecting two directions upwards and downwards by an up-down mechanism driven by a motor 9350. The laser projection unit 9100 is leveled by two gradient sensors 9410 and 9420 formed in a main body. Further, the laser projection unit 9100 is set so as to be inclined in a predetermined direction after the leveling thereof.

This gradient setting can be done by converting outputs produced from the two gradient sensors 9410 and 9420 to the number of pulses and driving the motor 9350 based on a computed angle, for example. Incidentally, a suitable gradient detector can be adopted. If the laser projection unit 9100 is inclined in one direction alone, then a surface or plane inclined toward a predetermined direction can be formed. If the laser projection unit 9100 is inclined in two directions, then a combined inclined surface can be formed.

A description will next be made of the structure in which a laser projection unit 9100 is supported by vertical and horizontal axes, based on FIG. 12. The present structure comprises a mount unit 9500 rotated about a vertical axis, and the laser projection unit 9100 rotated about a horizontal axis on the mount unit 9500. A rotating irradiator 9200 is provided on the laser projection unit 9100 so that laser light can be turnably applied onto a reference plane. Further, the laser projection unit is leveled by suitable leveling means in a manner similar to the structure in which the laser projection unit is supported by the spherical surface.

In the structure in which the laser projection unit 9100 is supported on the vertical and horizontal axes, the mount unit is rotated in a predetermined direction in such a manner that the direction of rotation of the laser projection unit 9100 coincides with a sloping direction. After the rotation of the mount unit, the laser projection unit 9100 is inclined to a predetermined tilt angle so as to perform gradient setting.

Incidentally, the combined inclined surface can be formed by performing an arithmetic operation from two-way gradient data and inclining the laser projection unit in a direction determined based on the result of operation.

However, the conventional laser surveying apparatus has a problem in that although no errors are produced when a rotatable shaft of a gradient setting device is turned with an ideal arbitrary axis as the center, an axial backlash for providing a smooth rotation is actually required and a converted value of an angle corresponding to the axial backlash will result in a gradient error.

Thus, there has been a strong demand for the appearance of a laser surveying apparatus capable of reducing a gradient error produced due to an axial backlash and improving gradient setting accuracy.

Further, the rotatable laser system supported by the spherical surface has a problem in that while relatively high-accuracy setting is allowed because a basic structure for setting a gradient or inclination is simple, it is not suitable for high-gradient setting because a structural limitation is imposed to the set gradient.

Moreover, the rotatable laser system supported on the vertical and horizontal axes has a problem in that although the setting of a high gradient is relatively easy, high working accuracy is required because many errors are accumulated in the rotatable shaft as described above, thus causing an increase in cost.

SUMMARY OF THE INVENTION

The present invention relates to a laser surveying apparatus capable of forming a measuring reference line and a reference plane by laser light. The present laser surveying apparatus is constructed in such a manner that a mount unit is rotated about a vertical axis, a laser projection unit is rotated about a horizontal axis, a light source applies laser light in a direction parallel to the horizontal axis, a rotating irradiator turnably applies the laser light onto the reference plane, first deflecting means provided in the laser projection unit deflects the laser light in an intersecting direction, and second deflecting means provided in the rotating irradiator deflects the laser light sent from the first deflecting means in an intersecting direction.

Typical ones of various inventions of the present inventions have been shown in brief. However, the various inventions of the present application and specific configurations of these inventions will be understood from the following description.

BRIEF DESCRIPTION OF THE DRAWINGS

The drawings show embodiments of the present invention, in which:

FIG. 3(*b*) is a diagram for describing an electric system of an automatic leveling unit;

DESCRIPTION OF THE INVENTION

A preferred embodiment of the present invention will hereinafter be described with reference to the accompanying drawings.

(Principle)

The principle of the present invention will now be described.

[Regarding rotatable-shaft backlash of gradient setting device]

A rotatable-shaft backlash will first be explained.

Figure 4:
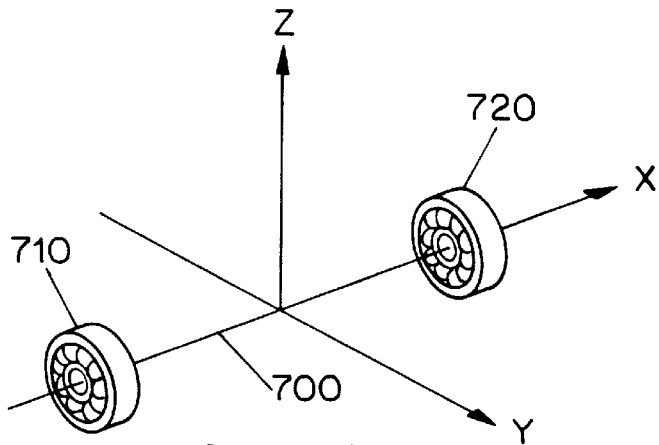
FIG. 4 is a diagram for explaining a rotatable-shaft backlash of a gradient setting device.

As shown in FIG. 4, a rotatable shaft 700 is disposed in an X-axis direction and rotatably supported by a first bearing 710 and a second bearing 720. Laser light is applied in the direction orthogonal to the rotatable shaft 700 (X axis). An optical axis along which the laser light is applied, will be defined as a Z axis.

Figure 5:
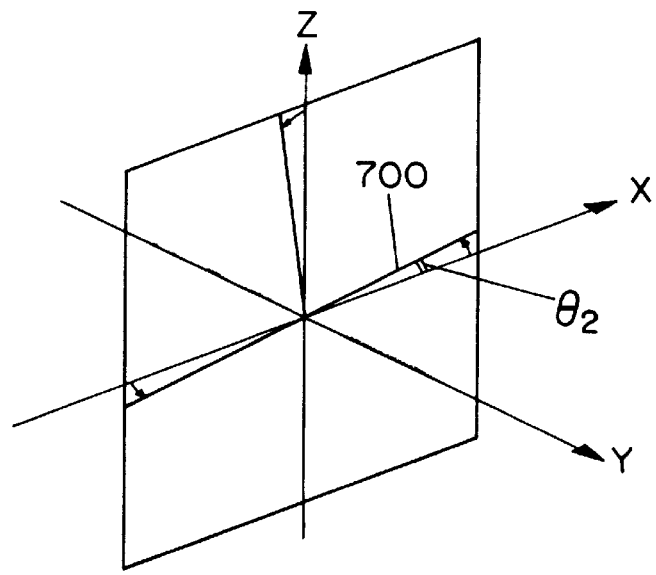
FIG. 5 is a diagram for describing an XZ in-plane error $\theta_1$.
Figure 6:
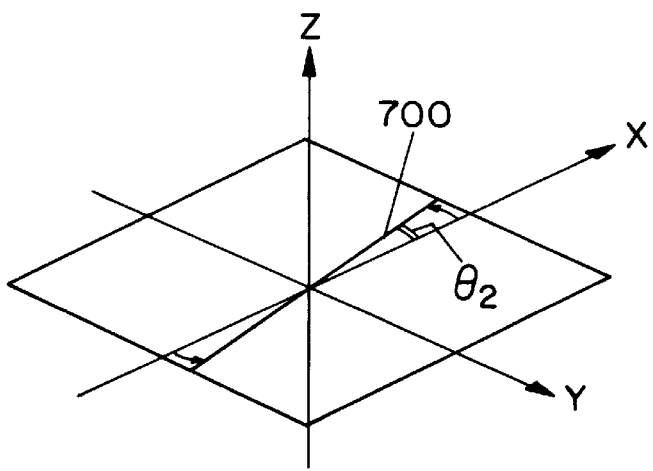
FIG. 6 is a diagram for describing an XZ in-plane error $\theta_2$.

Gradient errors produced in an optical system due to a backlash of the rotatable shaft 700 include an XZ in-plane error $\theta_1$ shown in FIG. 5 and an XY in-plane error $\theta_2$ shown in FIG. 6.

[Principle of correction using image rotator 960]

(1) Correction on XZ in-plane error $\theta_1$

Figure 7A:
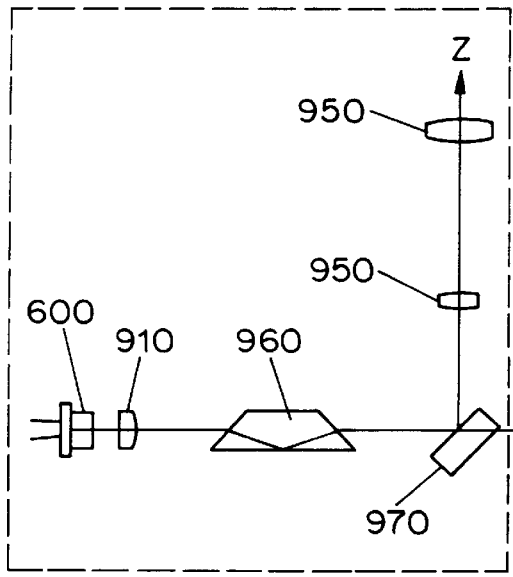
FIG. 7 is a diagram for explaining the principle of a correction using an image rotator.

As shown in FIG. 7(a), laser light emitted from a laser light source 600 is set parallel by a collimator lens 910 so as to fall upon the image rotator 960. The laser light, which has passed through the image rotator 960, is launched into a mirror 970. The laser light, which has been launched into the mirror 970, is deflected by 90 degrees so as to be reflected onto a Z axis orthogonal to its incident direction.

Further, angular magnification reducing means 950 is placed on the Z axis. The angular magnification reducing means 950 employed in the present embodiment is set to $f_1:f_2=2:1$ and used to correct an XZ in-plane error $\theta_1$. The angular magnification reducing means 950 is configured on a rotatable shaft 700 except for the image rotator 960. The image rotator 960 is fixed to the body side of the laser system.

Figure 7B:
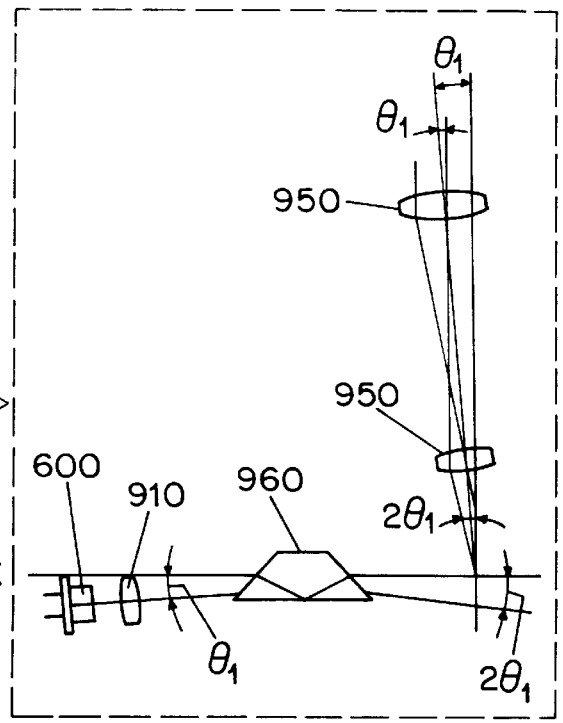

As shown in FIG. 7(b), when the present embodiment is rotated by an angle $\theta_1$ within an XY plane, the laser light launched into the image rotator 960 is also inclined the angle $\theta_1$. The image rotator 960 is constructed in such a manner that the incident laser light is refracted therein and reflected once by its internal wall surface and the reflected laser light is refracted again, followed by emission to the outside.

Since an incident surface and an outgoing or emitting surface of the image rotator 960 have inclined surfaces each set at the same angle, the emitted laser light is inclined an angle $2\theta_1$ in the direction opposite to that at the incident angle $\theta_1$.

The laser light emitted from the image rotator 960 is deflected by 90 degrees by the mirror 970, so that it is inclined an angle $2\theta_1$ toward or with respect to the Z axis.

Further, the laser light launched into the angular magnification reducing means 950 placed on the Z axis is inclined an angle $2\theta_1$ toward the Z axis and inclined an angle $2\theta_1+\theta_1$ toward the vertical axis. Since, however, the angular magnification reducing means 950 is set to $f_1:f_2=2:1$ although the incident laser light is inclined in the reverse direction, the inclination of the laser light is corrected to $2\theta_1 * \frac{1}{2}$ by the angular magnification reducing means 950, whereby the XZ in-plane error is corrected.

(2) Correction on XY in-plane error $\theta 2$

Figure 7C:
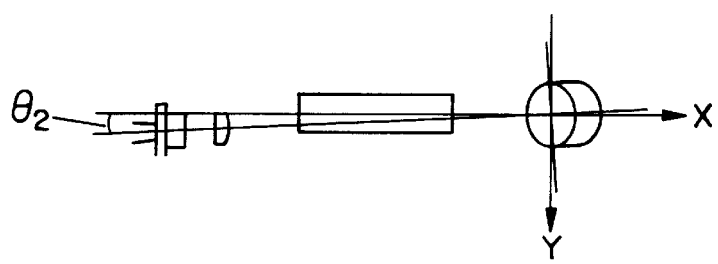

When the present embodiment is rotated by an angle $\theta_2$ within the XY in-plane as shown in FIG. 7(c), it is inclined the angle $\theta_2$ regardless of the image rotator 960. Since, however, the laser light source 600 and the mirror 970 are integral with each other, the laser light is reflected by a reflecting surface of the mirror 970 at the right angle in a 90° direction. Thus, the corresponding XY in-plane error $\theta_2$ is canceled.

[Embodiments]
[First embodiment]

Figure 1:
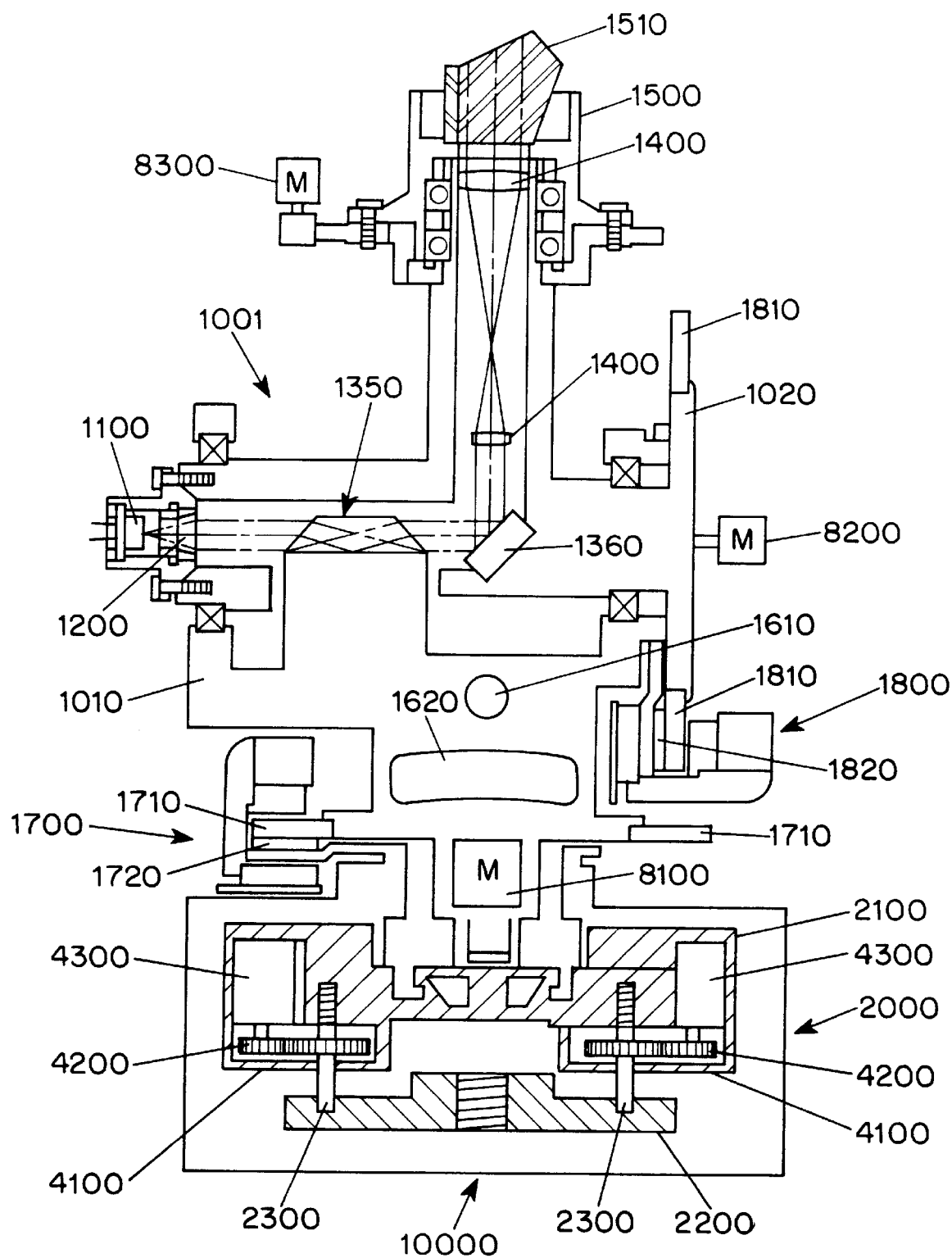
FIG. 1 is a diagram showing a laser system according to a first embodiment of the present invention.

As shown in FIG. 1, a laser apparatus or system 10000 according to the present embodiment comprises a body 1000 of the laser system 10000, which is capable of setting a gradient or inclination in a predetermined direction, and an automatic leveling unit 2000 for placing the body 1000 thereon horizontally. The body 1000 is coupled to the automatic leveling unit 2000 so that their unillustrated vertical axes coincide with each other, and is attached thereto so as to be rotatable in the horizontal direction.

As shown in FIG. 1, the body 1000 comprises a mount unit 1010 which rotates about the vertical axis and directs the body in an inclined direction, and a laser projection unit 1020 which is placed on the mount unit 1010 and rotates about the horizontal axis intersecting the vertical axis so as to set a gradient or inclination.

The mount unit 1010 is configured rotatably by mount unit driving means 8100 which is made up of suitable rotating means such as a motor or the like.

Further, the laser projection unit 1020 is also constructed rotatably by laser projection unit driving means 8200 comprised of suitable rotating means such as a motor or the like.

Further, the body 1000 is provided with a light source 1100, a collimator lens 1200, a laser light deflector 1300, an angular magnification reducer 1400, a rotating irradiator 1500, a gradient sensor 1600, a first angle-of-rotation detector 1700, and a second angel-of-rotation detector 1800.

The light source 1100 is a laser light source. In the present embodiment, a semiconductor laser is used as the light source 1100. However, any device may be used if the light source 1100 is a laser light irradicable device.

The collimator lens 1200 is used to set laser light emitted from the light source 1100 to a parallel light beam. In the present embodiment, the laser light is applied in the horizontal direction of the body 1000.

Incidentally, the body 1000 is constructed rotatably with the direction in which the laser light is emitted from the light source 1100 as the central axis. Thus, the body 1000 is rotatably mounted within a plane orthogonal to the horizontal direction.

An image rotator 1350 allows laser light incident via a collimator lens 1200 to pass therethrough so as to fall on a mirror 1360. The laser light launched into the mirror 1360 is deflected by 90 degrees so as to be reflected in the vertical direction.

An angular magnification reducer 1400 is placed in the vertical direction. The angular magnification reducer 1400 employed in the first embodiment is set to $f_1:f_2=2:1$ and used to correct an XZ in-plane error $\theta_1$.

When a body 1001 of a laser system is rotated by an angle $\theta_1$, the laser light launched into the image rotator 1530 is also inclined by the angle $\theta_1$. The image rotator 1530 is constructed in such a manner that the incident laser light is refracted therein and reflected once by its internal wall surface and the reflected laser light is refracted again, followed by emission to the outside. Since an incident surface and an outgoing or emitting surface of the image rotator 1530 have inclined surfaces each set at the same angle, the emitted laser light is inclined an angle $2\theta_1$ in the direction opposite to that at the incident angle $\theta_1$.

The laser light outputted from the image rotator 1530 is deflected by 90 degrees by the mirror 1360, so that it is inclined an angle $2\theta_1$ toward a Z axis.

Further, the laser light launched into the angular magnification reducer 1400 placed in the vertical direction is inclined an angle $2\theta_1$ toward the Z axis and inclined an angle $2\theta_1+\theta_1$ toward the vertical axis. Since, however, the angular magnification reducer 1400 is set to $f_1:f_2=2:1$ although the incident laser light is inclined in the reverse direction, the inclination of the laser light is corrected to $2\theta_1 * \frac{1}{2}$ by the angular magnification reducer 1400, whereby the XZ in-plane error is corrected.

The rotating irradiator 1500 is provided within the laser projection unit 1020 and is used to rotatably apply laser light onto a gradient-set reference plane. A pentaprism 1510 is fixed to the rotating irradiator 1500 and rotatably constructed by rotating irradiator driving means 8300. The laser light reflected in the vertical direction by the laser light deflector 1300 passes through the angular magnification reducer 1400, followed by falling upon the pentaprism 1510.

The laser light launched into the pentaprism 1510 is deflected by 90 degrees so as to be reflected in the direction horizontal to the body 1000 and is rotatably applied in the horizontal direction with the rotation of the rotating head 1500. Thus, the laser light can be radiated into the reference plane so as to form a laser reference plane.

Incidentally, the pentaprism 1510 corresponds to the first deflecting means.

The gradient sensor 1600 comprises a first gradient sensor 1610 and a second gradient sensor 1620 and is capable of detecting the inclination of the body 1000. Any sensor may be adopted if the gradient sensor 1600 is one capable of detecting the inclination. In the present embodiment, a bubble tube is adopted as the gradient sensor 1600. The inclination of the body 1000 to the horizon can be detected by the first gradient sensor 1610 and the second gradient sensor 1620.

Figure 2:
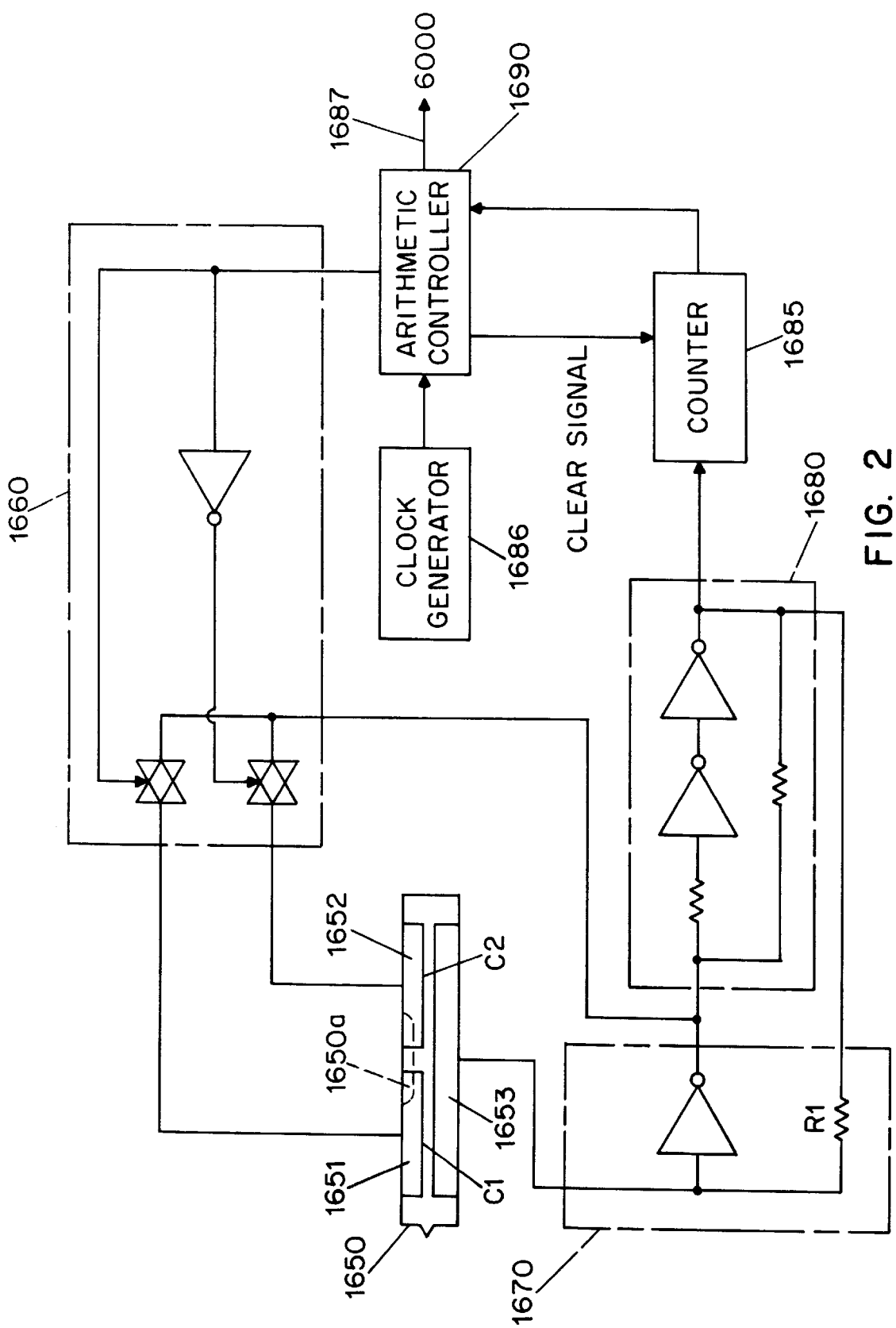
FIG. 2 is a diagram for describing a gradient sensor.

As the gradient sensor 1600 for detecting the inclination, for example, a sensor using a bubble tube shown in FIG. 2 can be utilized. This sensor is one of a type wherein two electrodes 1651 and 1652 are disposed on the upper surface of the bubble tube 1650 whereas an electrode 1653 is placed on the lower surface thereof, and a bubble 1650a moves according to the inclination of the bubble tube 1650 and is converted to changes in capacitances C1 and C2 between the electrodes 1651 and 1653 and between the electrodes 1652 and 1653, after which they are detected to determine an inclination θof the bubble tube 1650.

The first angle-of-rotation detector 1700 is used to detect the angle of rotation about the vertical axis (in the horizontal direction) of the mount unit 1010 and set an inclined direction. In the present embodiment, the first angle-of-rotation detector 1700 is constructed so that a rotor 1710 is attached to the mount unit 1010 and a stator 1720 is placed in a position opposed to the rotor 1710, whereby the angle of rotation between the rotor 1710 and the stator 1720 is detected. Any sensor may be used if the first angle-of-rotation detector 1700 is one capable of detecting the horizontal angle of rotation of the mount unit 1010.

The second angle-of-rotation detector 1800 is provided within the laser projection unit 1020 and is used to detect the angle of rotation about the horizontal axis In the present embodiment, the second angle-of-rotation detector 1800 is constructed in such a manner that a rotor 1810 is attached to the laser projection unit 1020 and a stator 1820 is placed in a position opposed to the rotor 1810, whereby the angle of rotation between the rotor 1810 and the stator 1820 is detected. Any sensor may be used if the second angle-of-rotation detector 1800 is one capable of detecting the angle of rotation about the horizontal axis of the laser projection unit 1020.

Figure 3A:
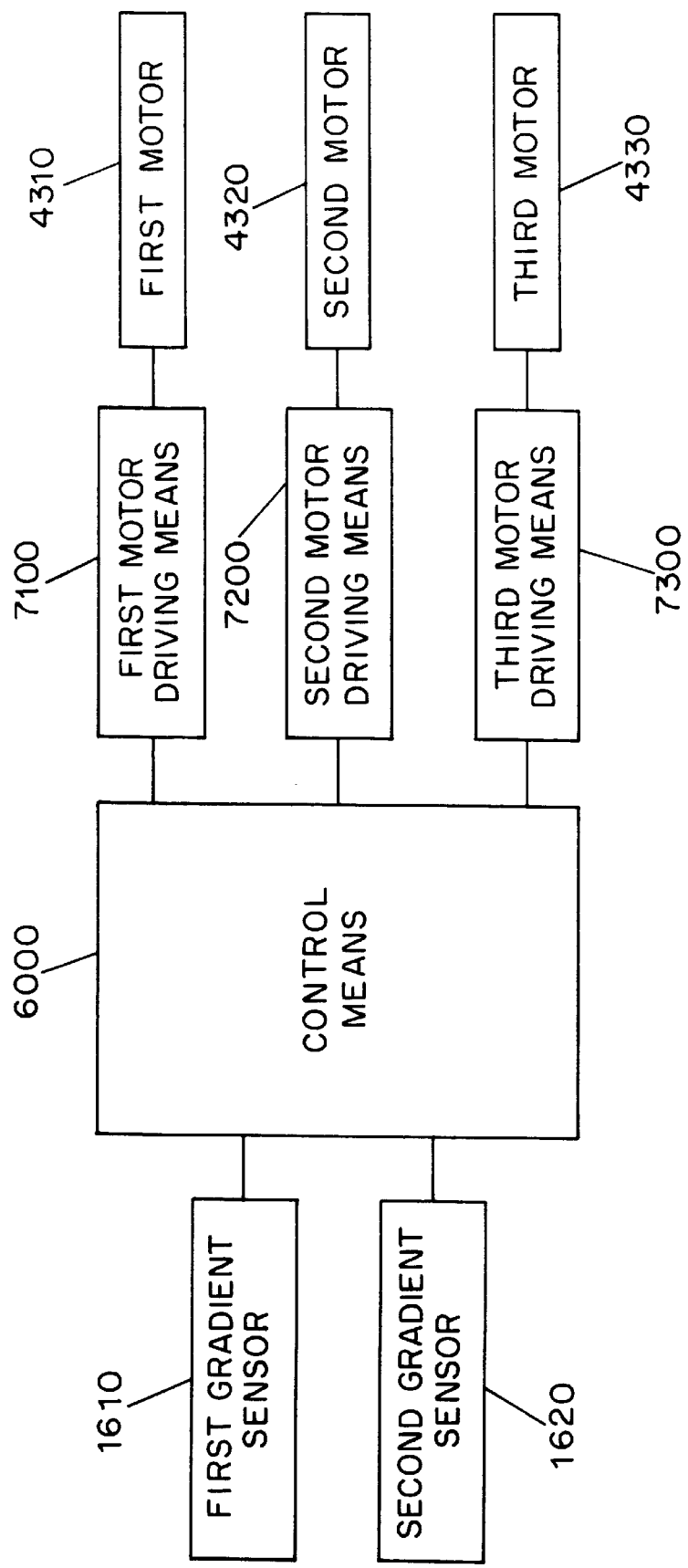
FIG. 3(*a*) is a diagram for describing an electrical configuration of the present embodiment.
Figure 3B:
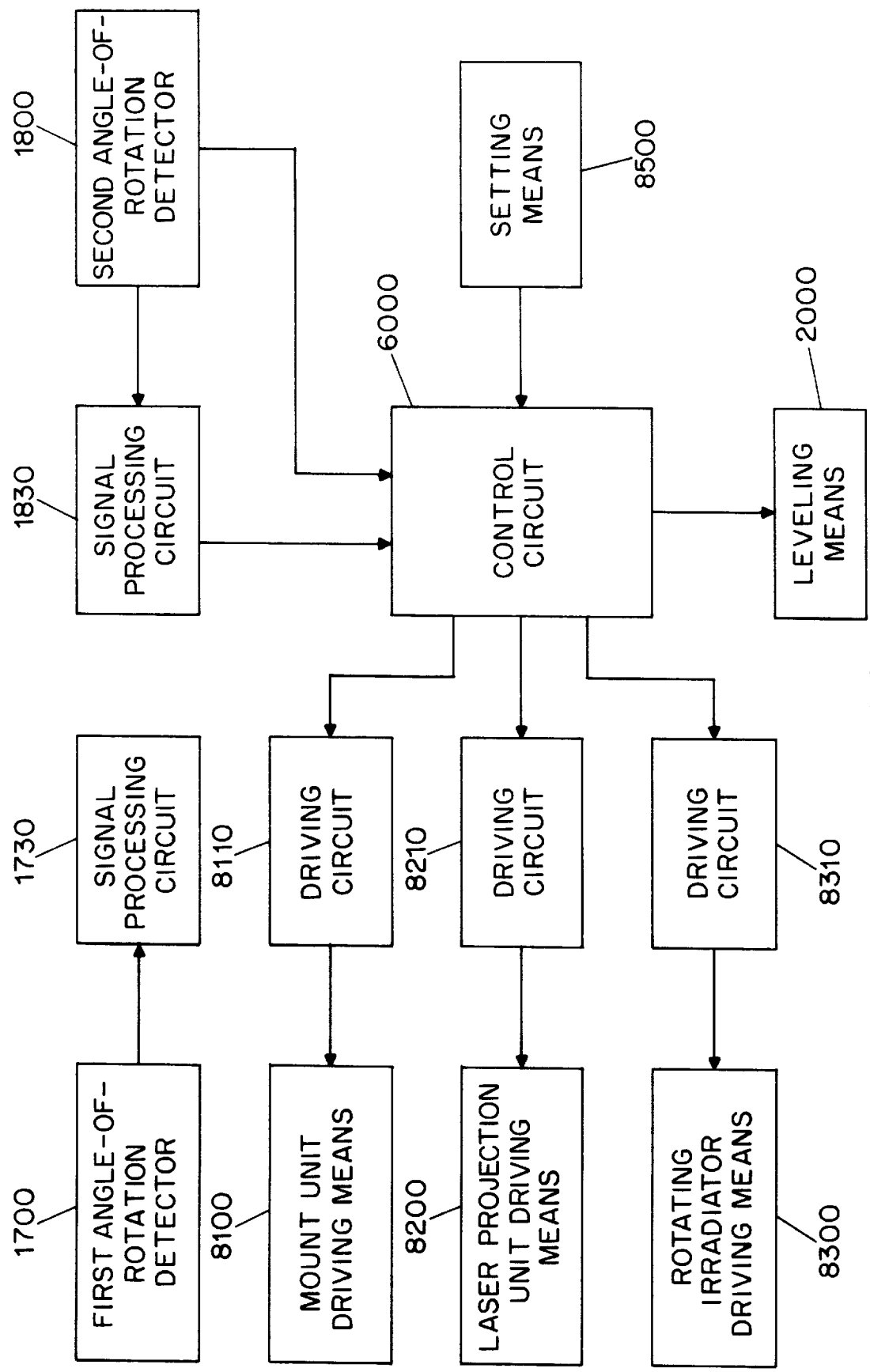

An electrical configuration of the present embodiment will next be described based on FIG. 3(b).

The present embodiment comprises mount unit driving means 8100, a mount unit driving circuit 8110 for controlling and driving the mount unit driving means 8100, laser projection unit driving means 8200, a laser projection unit driving circuit 8210 for driving the laser projection unit driving means 8200, rotating irradiator driving means 8300, rotating irradiator driving circuit 8310 for driving the rotating irradiator driving means 8300, a first angle-of-rotation detector 1700, a first signal processing circuit 1730 for processing a signal outputted from the first angle-of-rotation detector 1700, a second angle-of-rotation detector 1800, a second signal processing circuit 1830 for processing a signal outputted from the second angle-of-rotation detector 1800, control means 6000, setting means 8500, and an automatic leveling unit 2000.

Based on the detected signals outputted from the first angle-of-rotation detector 1700 and the second angle-of-rotation detector 1800 respectively, the control means 6000 is constructed so as to compute the amount of driving for creating a laser reference plane in a predetermined direction and drive the mount unit driving means 8100, the laser projection unit driving means 8200 and the rotating irradiator driving means 8300 through the mount unit driving circuit 8110, the laser projection unit driving circuit 8210 and the rotating irradiator driving circuit 8310.

Incidentally, the setting means 8500 sets data for obtaining a predetermined laser reference plane. If, for example, the setting means 8500 sets a bidirectional combined gradient, then the control means 6000 performs a computation based on set data to thereby form a predetermined laser reference plane.

Further, the setting means 8500 corresponds to reference data setting means.

Moreover, the rotating irradiator driving means 8300 corresponds to first driving means, the mount unit driving means 8100 corresponds to second driving means, and the laser projection unit driving means 8200 corresponds to third driving means.

The control means 6000 allows the automatic leveling unit 2000 to match the center of rotation of the mount unit 1010 with the vertical direction, based on data from the first gradient sensor 1610 and the second gradient sensor 1620. The details thereof will be described below.

The body 1000 constructed as described above scans the laser beam in the horizontal or vertical direction and is capable of performing a horizontal arrangement, centering, a vertical arrangement, etc. Namely, a laser beam scanned within a horizontal plane is detected on an object to be measured. Thus, a ground reference point can be shifted and set by performing leveling or the like from the achievable height of the beam or visually placing the laser beam in the vertical direction.

The automatic leveling unit 2000 comprises a leveling table 2100 and a bottom plate 2200. The leveling table 2100 is supported adjustably in upward and downward directions by three leveling screws 2300, 2300 and 2300.

An electric system of the automatic leveling unit 2000 will next be described based on FIG. 3(a). The electric system comprises the first gradient sensor 1610, the second gradient sensor 1620, the control means 6000, first motor driving means 7100, second motor driving means 7200, third motor driving means 7300, a first motor 4310, a second motor 4320 and a third motor 4330.

The first gradient sensor 1610 is used to detect the inclination of the body 1000 in the direction parallel to the direction in which arbitrary two leveling screws 2300 and 2300 are connected.

The second gradient sensor 1620 is used to detect the inclination of the body 1000 in the direction orthogonal to the detecting direction of the first gradient sensor 1610.

The control means 6000 computes displacements of the leveling screws 2300, 2300 and 2300 necessary for setting the leveling table 2100 to a reference plane or surface, based on signals outputted from the first gradient sensor 1610 and the second gradient sensor 1620. Namely, the control means 6000 calculates the respective amounts of movements of such three leveling screws 2300, 2300 and 2300 that both inclined angles detected by the first gradient sensor 1610 and the second gradient sensor 1620 reach zero.

The control means 6000 transmits control signals corresponding to the amounts of movements of the respective leveling screws 2300, 2300 and 2300 to their corresponding first, second and third motor driving means 7100, 7200 and 7300. The first, second and third motor driving means 7100, 7200 and 7300 generate power for rotating the motors 4310, 4320 and 4330 based on the control signals outputted from the control means 6000 through unillustrated connectors.

The motors 4310, 4320 and 4330 rotate the leveling screws 2300, 2300 and 2300 based on the power supplied from the motor driving means 7100, 7200 and 7300 to thereby correct the inclination of the leveling table 2100. The first gradient sensor 1610 and the second gradient sensor 1620 detect the inclination of the leveling table 2100 again and perform feedback control to thereby make it possible to accurately level the vertical axis of the body 1000 vertically (set it to the reference plane).

Since the automatic leveling unit 2000 is used in the present embodiment constructed as described above, an observer can automatically level the vertical axis or the body 1000 of the laser system without manually operating the leveling screws 2300, 2300 and 2300 while visually recognizing a plane level.

[Second embodiment]

Figure 8:
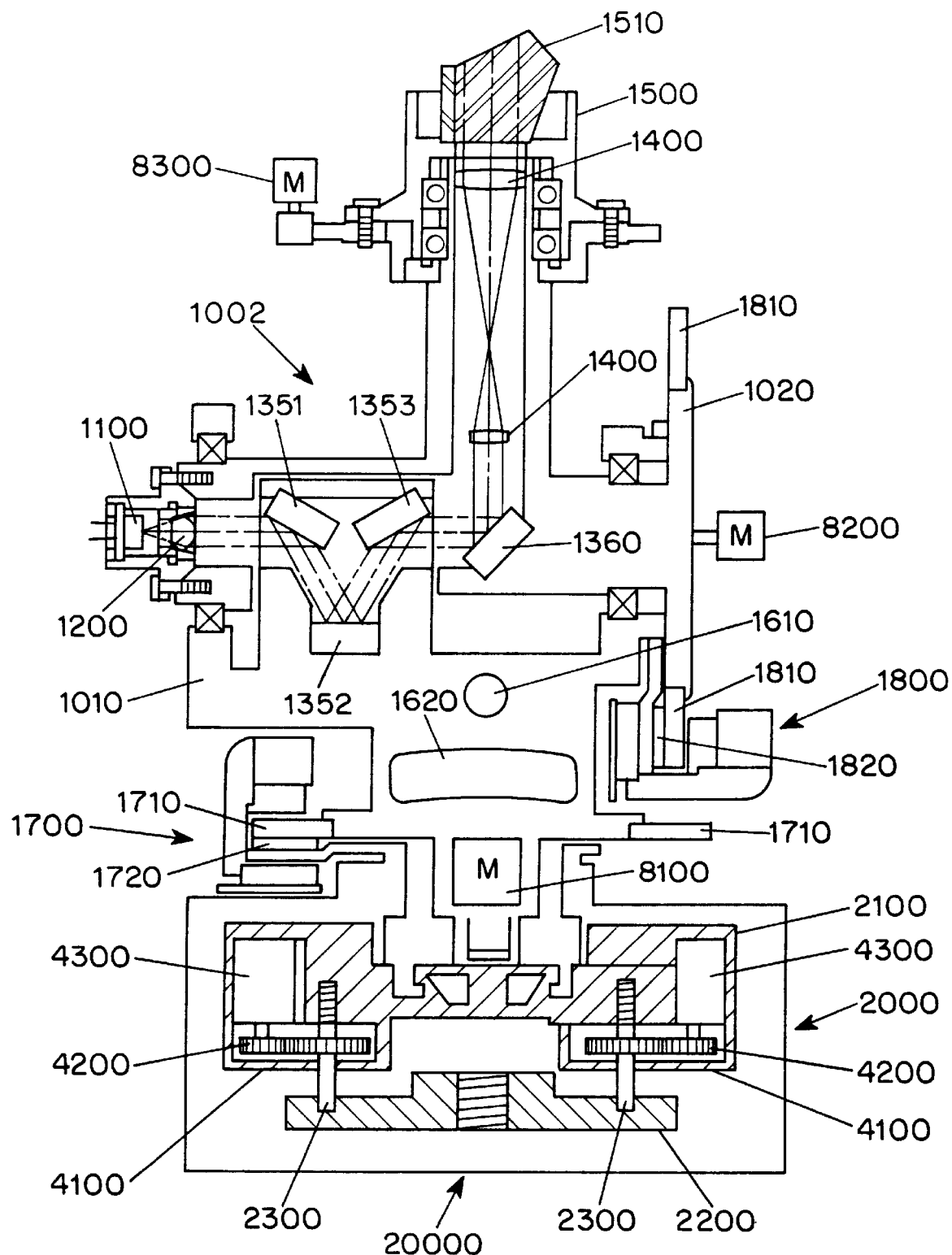
FIG. 8 is a diagram for describing a laser system according to a second embodiment of the present invention.

As shown in FIG. 8, a laser system 20000 according to a second embodiment comprises a body 1002 of the laser system, which is capable of setting a gradient or inclination in a predetermined direction, and an automatic leveling unit 2000 for placing the body 1002 thereof thereon horizontally. The body 1002 is coupled to the automatic leveling unit 2000 and attached thereto so as to be rotatable in the horizontal direction.

Further, the body 1002 is provided with a light source 1100, a collimator lens 1200, a first reflecting mirror 1351, a second reflecting mirror 1352, a third reflecting mirror 1353, a mirror 1360, an angular magnification reducer 1400, a rotating irradiator 1500, a gradient sensor 1600, a first angle-of-rotation detector 1700, and a second angle-of-rotation detector 1800.

The first reflecting mirror 1351, second reflecting mirror 1352 and third reflecting mirror 1353 are respectively equivalent to the image rotator 1350 employed in the first embodiment.

When the body 1002 is rotated by an angle $\theta_1$, laser light launched into the first reflecting mirror 1351 is also inclined by the angle $\theta_1$. Further, the first reflecting mirror 1351 reflects the incident laser light thereon. After the laser light reflected by the first reflecting mirror 1351 is reflected by the second reflecting mirror 1352, it is reflected by the third reflecting mirror 1353, followed by emission to the outside.

The laser light transmitted through the first reflecting mirror 1351, the second reflecting mirror 1352 and the third reflecting mirror 1353 is deflected by 90 degrees through the mirror 1360 so that it is inclined an angle $2\theta_1$.

Although the laser light launched into the angular magnification reducer 1400 disposed in the vertical direction is inclined the angle $2\theta_1$, in a manner similar to the first embodiment, the inclination of the laser light is corrected to $2\theta_1 * \frac{1}{2}$ by the angular magnification reducer 1400 so that an XZ in-plane error $\theta_1$ is corrected.

Since other configurations, effects and operation of the second embodiment are identical to those of the first embodiment, their description will be omitted.

[Third embodiment]

Figure 9:
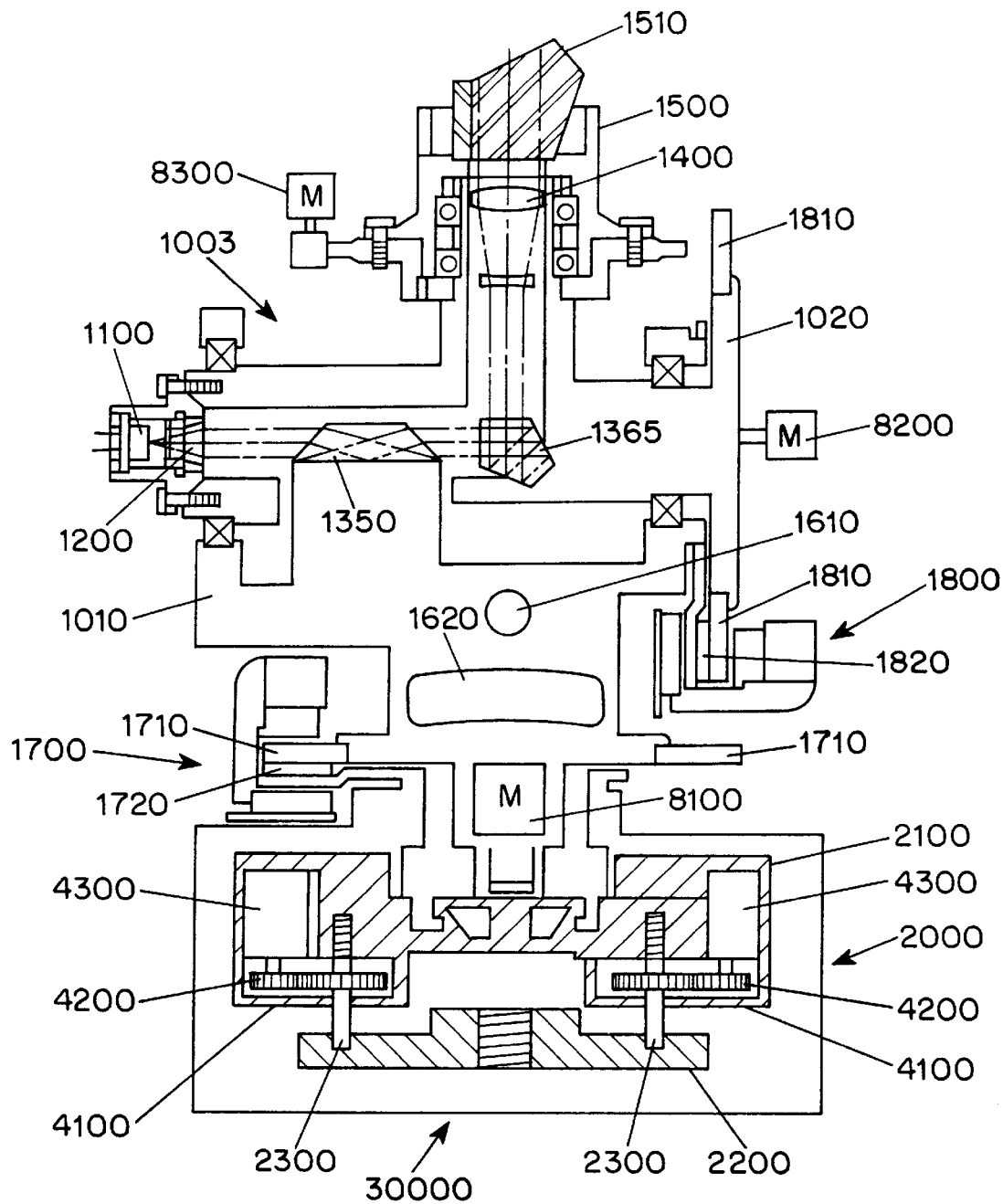
FIG. 9 is a diagram for describing a laser system according to a third embodiment of the present invention.

As shown in FIG. 9, a laser system 30000 according to a third embodiment comprises a body 1003 of the laser system 30000, which is capable of setting a gradient or inclination in a predetermined direction, and an automatic leveling unit 2000 for placing the body 1003 thereon horizontally. The body 1003 is coupled to the automatic leveling unit 2000 and attached thereto so as to be rotatable in the horizontal direction.

Further, the body 1003 is provided with a light source 1100, a collimator lens 1200, an image rotator 1350, a pentaprism 1365, an angular magnification reducer 1400, a rotating irradiator 1500, a gradient sensor 1600, a first angle-of-rotation detector 1700, and a second angle-of-rotation detector 1800.

The image rotator 1350 allows laser light incident via the collimator lens 1200 to pass therethrough so as to fall on the pentaprism 1365. The laser light launched into the pentaprism 1365 is deflected by 90 degrees so as to be reflected in the vertical direction.

The angular magnification reducer 1400 is placed in the vertical direction. The angular magnification reducer 1400 employed in the second embodiment is set to $f_1:f_2=2:1$ and used to correct an XZ in-plane error $\theta_1$.

When the body 1003 of the laser system is rotated by an angle $\theta_1$, the laser light launched into the image rotator 1530 is also inclined the angle $\theta_1$. The image rotator 1530 is constructed in such a manner that the incident laser light is refracted therein and reflected once by its internal wall surface and the reflected laser light is refracted again, followed by emission to the outside. Since an incident surface and an outgoing or emitting surface of the image rotator 1530 have inclined surfaces each set at the same angle, the emitted laser light is inclined an angle $2\theta_1$ in the direction opposite to that at the incident angle $\theta_1$.

The laser light emitted from the image rotator 1530 is deflected by the pentaprism 1365, so that it is inclined an angle $2\theta_1$ toward a Z axis.

As distinct from a mirror, the pentaprism 1365 performs a correction in conjunction with the angular magnification reducer using a [concave lens] to incline the laser light by the angle $2\theta_1$ in the direction opposite to the Z axis.

Although the laser light launched into the angular magnification reducer 1400 placed in the vertical direction is rotated and inclined by an angle $2\theta_1$, the inclination of the laser light is corrected to $2\theta_1 * \frac{1}{2}$ by the angular magnification reducer 1400, whereby the XZ in-plane error $\theta_1$ is corrected.

Since other configurations, effects and operation of the third embodiment are identical to those of the first and second embodiments, their description will be omitted.

[Fourth embodiment]

Figure 10:
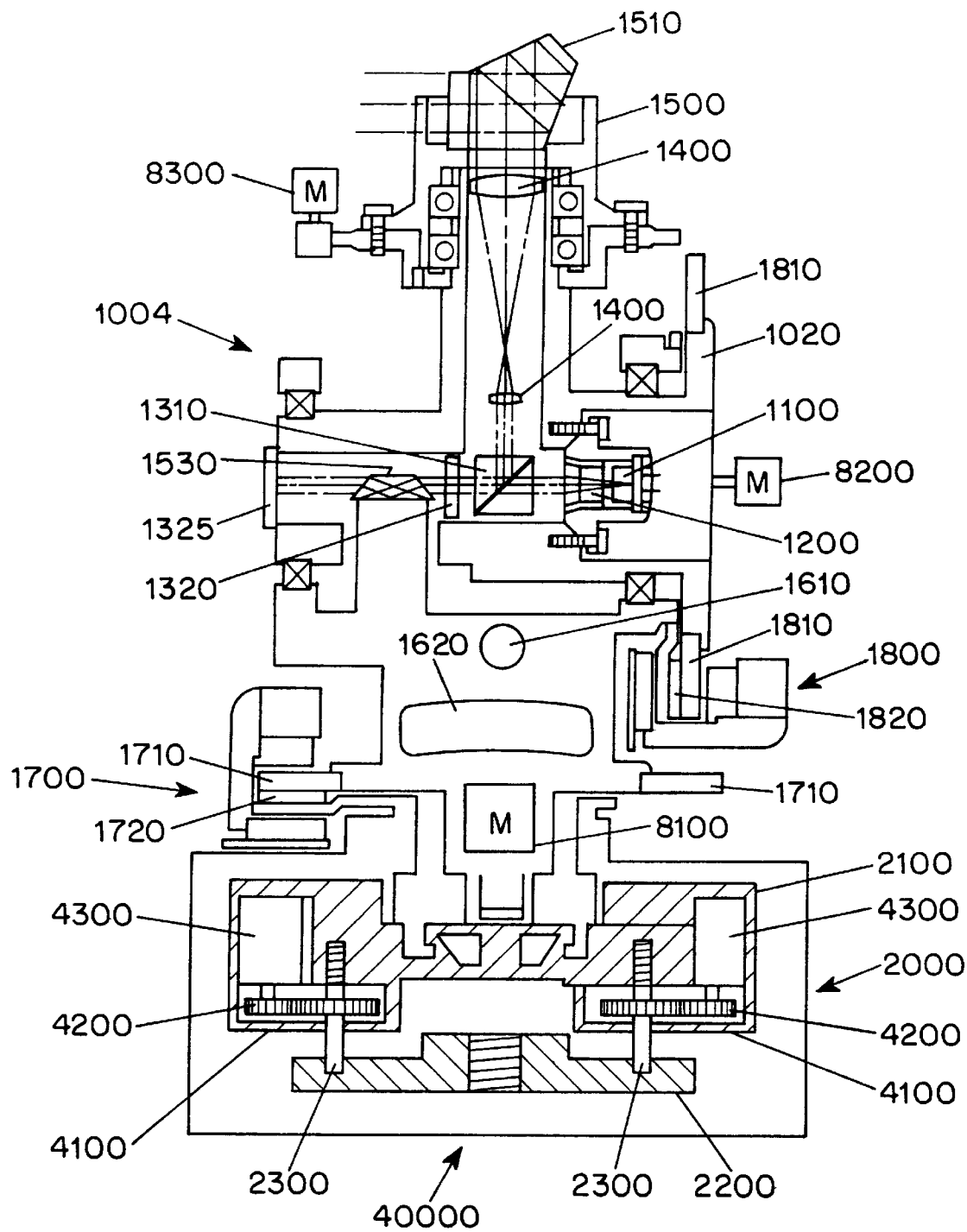
FIG. 10 is a diagram for describing a laser system according to a fourth embodiment of the present invention.
Figure 11:
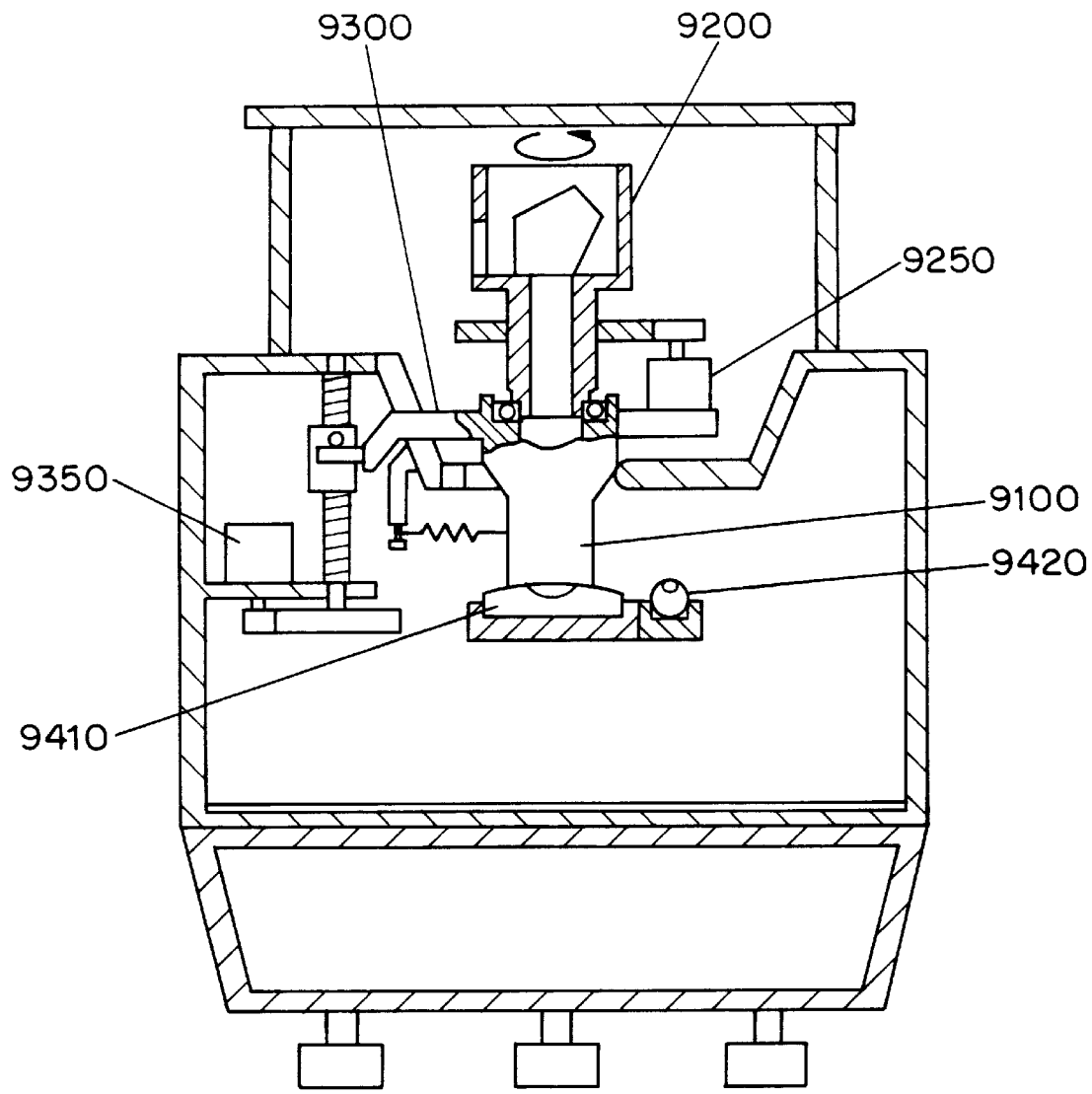
FIG. 11 is a diagram for describing a prior art.
Figure 12:
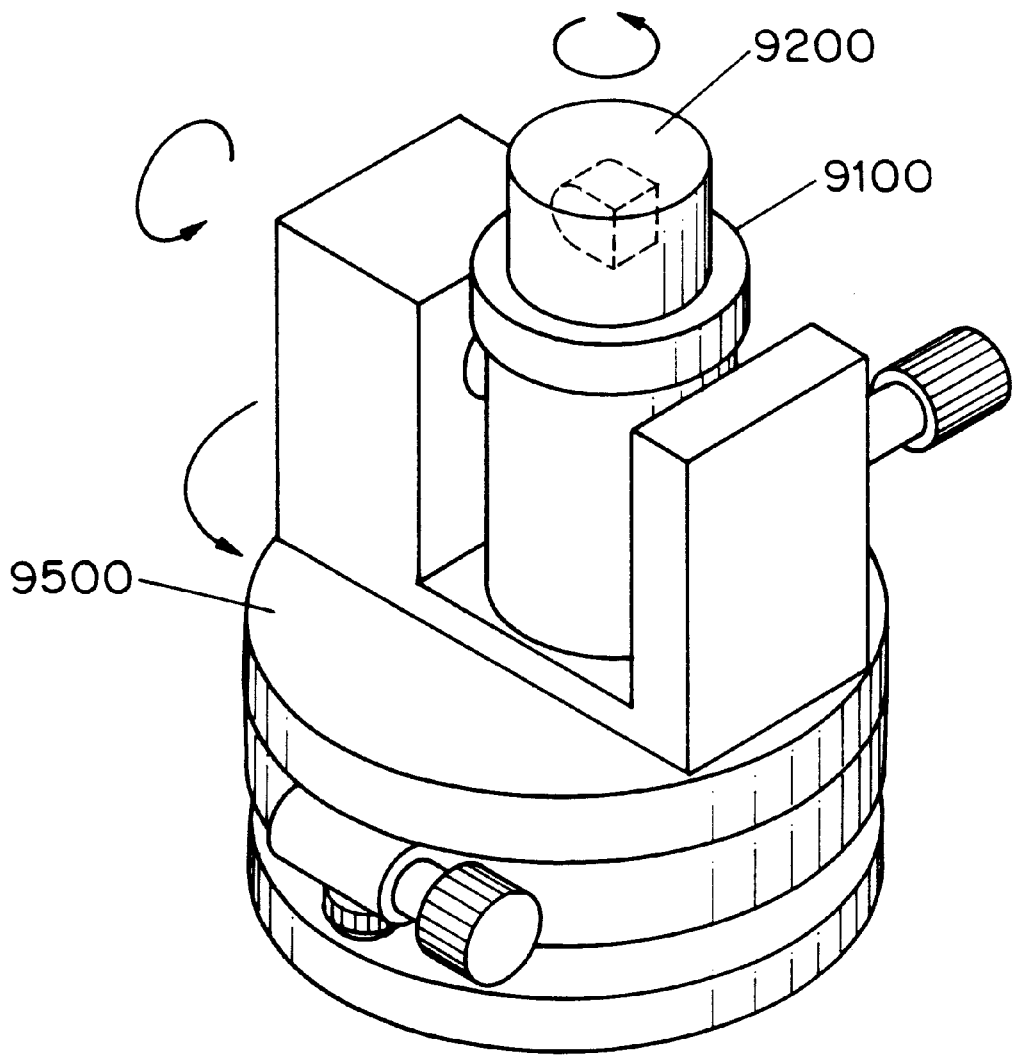
FIG. 12 is a diagram for describing the prior art.

As shown in FIG. 10, a laser system 40000 according to a fourth embodiment comprises a body 1004 of the laser system 40000, which is capable of setting a gradient or inclination in a predetermined direction, and an automatic leveling unit 2000 for placing the body 1004 thereon horizontally. The body 1004 is coupled to the automatic leveling unit 2000 and attached thereto so as to be rotatable in the horizontal direction.

As distinct from other embodiments, the body 1004 is provided with a light source 1100 provided on the opposite side of a shaft thereof, a collimator lens 1200, a polarizing beam splitter 1310, a ¼-wavelength plate 1320, an image rotator 1530, a mirror 1325, an angular magnification reducer 1400, a rotating irradiator 1500, a gradient sensor 1600, a first angle-of-rotation detector 1700, and a second angle-of-rotation detector 1800.

The polarizing beam splitter 1310 allows laser light incident via the collimator lens 1200 to pass therethrough so as to fall on the image rotator 1530 through the ¼-wavelength plate 1320. The laser light emitted from the image rotator 1530 is reflected by the mirror 1325 and transmitted through the image rotator 1530 again, followed by emission to the polarizing beam splitter 1310 through the ¼-wavelength plate 1320.

The laser light launched into the polarizing beam splitter 1310 is deflected by 90 degrees so as to be reflected in the vertical direction.

The angular magnification reducer 1400 is placed in the vertical direction. The angular magnification reducer 1400 employed in the fourth embodiment is set to $f_1:f_2=4:1$ and used to correct an XZ in-plane error $\theta_1$. Namely, since the laser light is transmitted through the image rotator 1530 twice in the fifth embodiment, the angle thereof is set to $4\theta_1$.

Since the mirror 1325 and the laser light source or the like are integrally formed in the fourth embodiment, it is unnecessary to provide a rectangular prism or the like.

According to the present invention constructed as described above, a mount unit is rotated about a vertical axis, a laser projection unit supported by the mount unit is rotated about a horizontal axis, a light source provided within the laser projection unit applies laser light in the direction parallel to the horizontal axis, a rotating irradiator provided in the laser projection unit turnably applies the laser light onto a reference plane, first deflecting means provided in the laser projection unit deflects the laser light in an intersecting direction, and second deflecting means provided in the rotating irradiator deflects the laser light sent from the first deflecting means in an intersecting direction. The first deflecting means comprises a mirror and an image rotator is placed between the mirror and the light source. Therefore, a high gradient can be set even in the case of a rotatable laser system of a type supported by a spherical surface, and many errors are not stored or accumulated in a rotatable shaft even in the case of a rotatable laser system of a type supported on vertical and horizontal axes. Thus, an excellent effect can be brought about in that a low-cost and high-accuracy laser system can be provided.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A laser system, comprising:

a mount unit rotated about a vertical axis;

a laser projection unit supported by said mount unit and rotated about a horizontal axis;

a light source provided in said laser projection unit, for applying laser light in a direction parallel to the horizontal axis;

a rotating irradiator provided in said laser projection unit, for rotatably applying the laser light onto a reference plane;

first deflecting means provided in said laser projection unit, for deflecting the laser light in an orthogonal direction;

second deflecting means provided in said rotating irradiator, for deflecting the laser light emitted from said first deflecting means in an orthogonal direction, and an image rotator is placed between said first deflecting means and said light source.

2. A laser system, comprising:

a mount unit rotated about a vertical axis;

a laser projection unit supported by said mount unit and rotated about a horizontal axis;

a light source provided in said laser projection unit, for applying laser light in a direction parallel to the horizontal axis;

a rotating irradiator provided in said laser projection unit, for turnably applying the laser light onto a reference plane;

first deflecting means provided in said laser projection unit, for deflecting the laser light in an intersecting direction; and second deflecting means provided in said rotating irradiator, for deflecting the laser light outputted from said first deflecting means in an intersecting direction, wherein said first deflecting means comprises a pentamirror and an image rotator is placed between the pentamirror and said light source.

3. The laser system according to claim 1, wherein a first reflecting mirror, a second reflecting mirror, and a third reflecting mirror are used in place of the image rotator.

4. A laser system, comprising a mount unit rotated about a vertical axis;

a light source provided in said mount unit, for applying laser light in a direction parallel to a horizontal axis;

a laser projection unit supported by said mount unit and rotated about the horizontal axis;

a rotating irradiator provided in said laser projection unit, for turnably applying the laser light onto a reference plane;

first deflecting means provided in said laser projection unit, for deflecting the laser light in an intersecting direction; and second deflecting means provided in said rotating irradiator, for deflecting the laser light emitted from said first deflecting means in an intersecting direction, wherein said first deflecting means comprises a polarizing beam splitter, and a mirror for reflecting the laser light transmitted through said polarizing beam splitter, and a ¼-wavelength plate and an image rotator both placed between the mirror and said polarizing beam splitter are provided.

5. The laser system according to claim 1 wherein at least one angular magnification reducing means is provided on an optical path between said first deflecting means and said second deflecting means.

6. The laser system according to claim 1 wherein said mount unit is provided with a first angle-of-rotation detector for detecting a rotation about the vertical axis, and said laser projection unit is provided with a second angle-of-rotation detector for detecting a rotation about the horizontal axis.

7. The laser system according to claim 1, wherein the laser light is applied to an inclined surface placed in a predetermined direction, based on gradient-set data and the results of angular detection by said first angle-of-rotation detector and said second angle-of-rotation detector.

8. The laser system according to claim 2, wherein a first reflecting mirror, a second reflecting mirror, and a third reflecting mirror are used in place of the image rotator.

9. The laser system according to claim 2, wherein at least one angular magnification reducing means is provided on an optical path between said first deflecting means and said second deflecting means.

10. The laser system according to claim 3, wherein at least one angular magnification reducing means is provided on an optical path between said first deflecting means and said second deflecting means.

11. The laser system according to claim 4, wherein at least one angular magnification reducing means is provided on an optical path between said first deflecting means and said second deflecting means.

12. The laser system according to claim 8, wherein at least one angular magnification reducing means is provided on an optical path between said first deflecting means and said second deflecting means.

13. The laser system according to claim 2, wherein said mount unit is provided with a first angle-of-rotation detector for detecting a rotation about the vertical axis, and said laser projection unit is provided with a second angle-of-rotation detector for detecting a rotation about the horizontal axis.

14. The laser system according to claim 3, wherein said mount unit is provided with a first angle-of-rotation detector for detecting a rotation about the vertical axis, and said laser projection unit is provided with a second angle-of-rotation detector for detecting a rotation about the horizontal axis.

15. The laser system according to claim 4, wherein said mount unit is provided with a first angle-of-rotation detector for detecting a rotation about the vertical axis, and said laser projection unit is provided with a second angle-of-rotation detector for detecting a rotation about the horizontal axis.

16. The laser system according to claim 8, wherein said mount unit is provided with a first angle-of-rotation detector for detecting a rotation about the vertical axis, and said laser projection unit is provided with a second angle-of-rotation detector for detecting a rotation about the horizontal axis.

17. The laser system according to claim 2, wherein the laser light is applied to an inclined surface placed in a predetermined direction, based on gradient-set data and the results of angular detection by said first angle-of-rotation detector and said second angle-of-rotation detector.

18. The laser system according to claim 3, wherein the laser light is applied to an inclined surface placed in a predetermined direction, based on gradient-set data and the results of angular detection by said first angle-of-rotation detector and said second angle-of-rotation detector.

19. The laser system according to claim 4, wherein the laser light is applied to an inclined surface placed in a predetermined direction, based on gradient-set data and the results of angular detection by said first angle-of-rotation detector and said second angle-of-rotation detector.

20. The laser system according to claim 6, wherein the laser light is applied to an inclined surface placed in a predetermined direction, based on gradient-set data and the results of angular detection by said first angle-of-rotation detector and said second angle-of-rotation detector.

* * * * *